Jan. 6, 1948.   E. C. PATTEE   2,433,864
PROCESS FOR RECOVERING POTASSIUM ACID TARTRATE FROM WINERY
RESIDUES CONTAINING POTASSIUM ACID TARTRATE AND
OTHER ORGANIC MATERIALS NOT IN SOLUTION
Filed Jan. 18, 1945

INVENTOR.
ELLIS C. PATTEE.
BY Louis Burgess
ATTORNEY.

Patented Jan. 6, 1948

2,433,864

UNITED STATES PATENT OFFICE 2,433,864

PROCESS FOR RECOVERING POTASSIUM ACID TARTRATE FROM WINERY RESIDUES CONTAINING POTASSIUM ACID TARTRATE AND OTHER ORGANIC MATERIALS NOT IN SOLUTION

Ellis C. Pattee, Cincinnati, Ohio, assignor to National Distillers Products Corporation, a corporation of Virginia Application January 18, 1945, Serial No. 573,444

4 Claims. (Cl. 260—527)

This is a new and useful process for recovering potassium acid tartrate from winery residues containing potassium acid tartrate and other organic materials not in solution. This application is a continuation in part of my prior application, Serial No. 488,735, filed May 27, 1943.

One example of the residues referred to is lees. In the manufacture of wine, the fermentation is permitted to proceed on the pomace for a longer or shorter period depending upon the type and character of wine desired. The supernatant liquid is then decanted from the pomace and transferred to other receptacles for further fermentation and/or storage. At the expiration of the fermentation and/or storage period, it is carefully decanted. The material left in the vessel is the lees. This consists of organic and other material together with more or less of the supernatant liquid phase depending upon the time of storage, care exercised in decanting, etc.

The lees may be subjected to my process in this condition. It is, however, economically desirable to recover the alcohol content of the liquid portion and for this reason I preferably subject it to distillation to recover the alcohol before undertaking the recovery of potassium acid tartrate therefrom. In this distillation it may be advisable to add more or less water to maintain the requisite fluidity in the still and to prevent crusting or burning. The residue left from this operation may be hereinafter referred to as dealcoholized lees. Another residue of the type referred to is winery still slops, i. e., the residue from fermenting and distilling the liquid obtained by expressing and/or washing the pomace and/or the residue left from the distillation of wine itself.

The invention will be described on the assumption that the starting material is dealcoholized lees or other still slops containing potassium acid tartrate and organic materials not in solution. The invention will be fully understood from the following description read in conjunction with the drawings in which.

Figure 1:
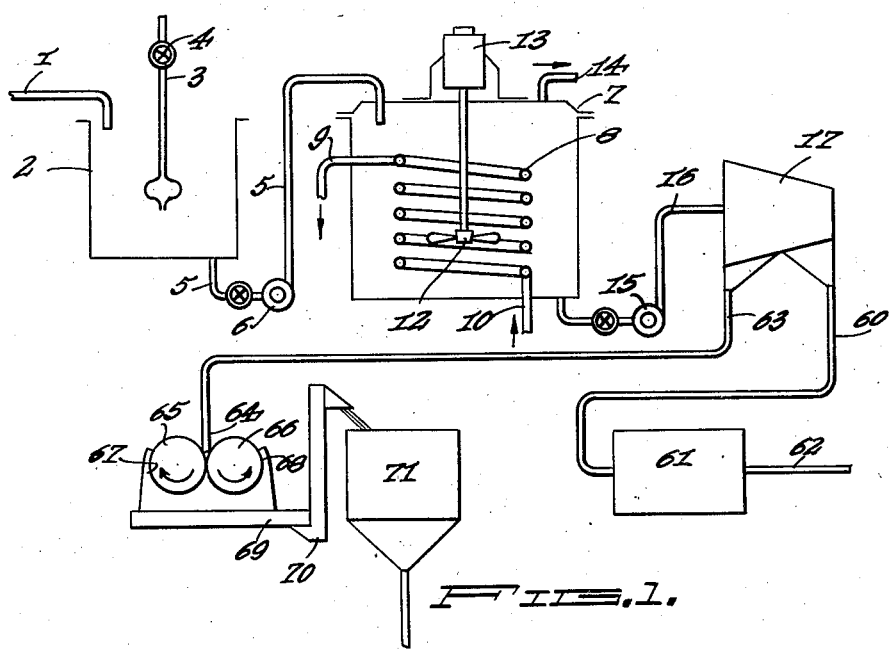
Fig. 1 is a diagrammatic side elevation of apparatus in which the process may be carried out.

Referring to the drawing, the said winery still slops is pumped through pipe 1 into tank 2 until tank 2 has been nearly filled. If the still slops has just been withdrawn from the still, it may not be necessary to heat it in tank 2 but if for any reason it has cooled, steam is introduced through pipe 3 controlled by valve 4 in amounts sufficient to bring into solution all or substantially all of the potassium acid tartrate in the batch of still slops in tank 2. For maximum economy of operation, the slops should be heated in this tank to a temperature of at least 200° F. and preferably to a temperature of approximately 212° F., and at this temperature should be substantially saturated with potassium acid tartrate. If the initial potassium acid tartrate content of the material was insufficient to saturate or substantially saturate the batch of slops at this temperature, the slops should be preliminarily concentrated to this point.

The batch of slops heated to a temperature of at least 200° F. and substantially saturated with potassium acid tartrate is then transferred by pump 6 through pipe 5 into cooling tank 7. This tank is provided with a cooling coil 8 to which a cooling liquid is introduced through the inlet 9 and from which the cooling liquid is withdrawn through the outlet 10. The tank is also provided with a mixing paddle 12 rotated through shaft 13 by any suitable means (not shown). The batch of slops is cooled in tank 7 by the circulation of cooling fluid through the coil 8 to the lowest temperature that can conveniently be obtained industrially with due regard to the speed of operation, temperature of the cooling medium available and other similar factors. If desired, the tank 7 may be completely enclosed so that the cooling can be assisted by the application of vacuum to the tank, and for this purpose, the vacuum outlet 14 is provided. During cooling, the paddle 12 is continuously operated. The cooling effected in tank 7 is relatively rapid and is accompanied by continuous or substantially continuous agitation of the batch of slops. Cooling should be at the rate of at least 5° F. per hour and preferably at the rate of at least 10° F. per hour. When cooled in this manner, the potassium acid tartrate will crystallize out of solution but the crystals formed are relatively small and not readily separable from the accompanying organic material. In particular, they are not efficiently separable by gravity settling from the accompanying organic material in contradistinction to the large crystals which form when a batch of slops is permitted to cool slowly, i. e., over a number of days and without agitation, resulting in the formation of relatively large and well-defined crystals.

Figure 2:
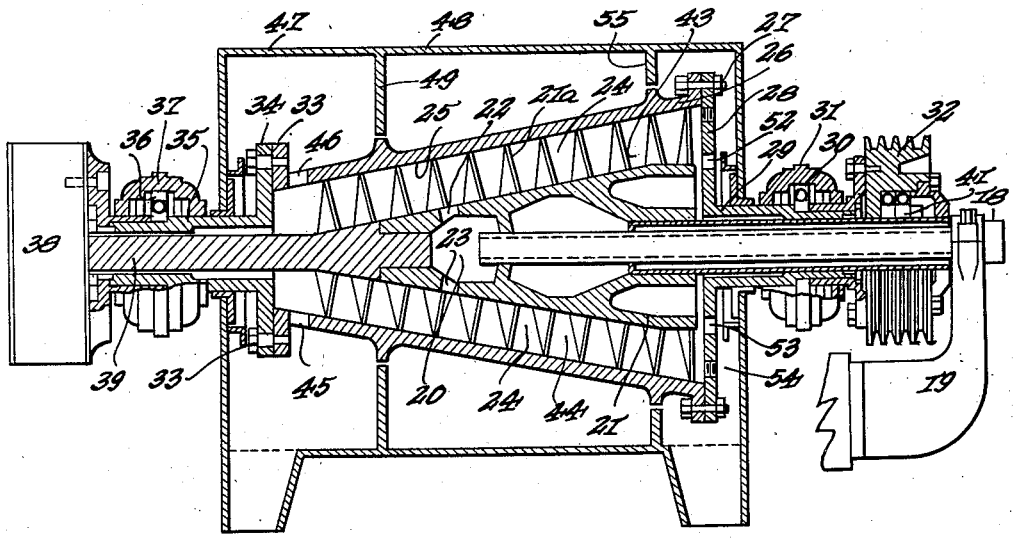
Fig. 2 is a vertical section through one element of the construction shown in Fig. 1.

The batch of slops may be cooled in this manner in tank 7 to a temperature ranging from 70° F. to 100° F. depending as above stated upon the temperature of the cooling medium average and other local factors. When this temperature has been reached, a part of the batch is continuously withdrawn from tank 7 by pump 15 and continuously discharged through pipe 16 into centrifuge 17. It will, of course, be understood that centrifuges can handle a definite and limited throughput per hour and for this reason the amount of slops introduced through pipe 16 must not exceed the capacity of the centrifuge. The internal construction and operation of centrifuge 17 will be evident from the detailed section thereof in Fig. 2.

The slops is delivered by pipe 16 into tube 18 which is held in a stationary position by bracket 19 and projects into the space 20 defined by conical member 21. This conical member rotates in a direction such that the upper part of the same moves away from the observer with the result that the residue is thrown centrifugally outward through ports 22 and 23 into space 24. Conical member 21 also carries helical scraper 21a. The helix is not continuous but is formed in sections with each section longitudinally overlapping the next section, but staggered slightly to provide a space through which liquid can flow longitudinally with reference to the axis of rotation. Space 24 is bounded inwardly by the exterior surface of conical member 21 and outwardly by the inner surface 25 of conical member 26. At one end, conical member 26 is connected by bolts 27 to flange 28 formed integrally with hollow shaft 29 rotatably by ball bearing 30 in pillow block 31. Shaft 29 is secured by studs to pulley 32 by which flange 28 and the conical member 26 are rotated. Conical member 26 is rotated in a direction such that the upper part of the same moves away from the observer. The other end of conical member 26 is connected through studs 33 to flange 34 formed integrally with shaft 35. Shaft 35 is rotatably carried by ball bearing 36 in pillow block 37. Shaft 35 is tubular, as shown, and within the same there is axially mounted shaft 39 extending outwardly from the differential gear box 38 and connected to conical member 21. The other end of conical member 21 is supported by tubular shaft 40 rotatably carried by ball bearing 41 in pulley 32. The differential gear box is adapted to rotate the conical member 21 and the helical scraper 21a at a slightly lower speed than conical member 26, say, 10 to 20 R. P. M. less, as a result of which conical member 26 revolves at a particular R. P. M. while conical member 21 revolves in the same direction but at a slightly lower R. P. M.

The slops discharged through ducts 22 and 23 to space 24 is subjected to centrifugal force, in consequence of which the material will accumulate in this space in a mass defined by a tubular inner wall indicated by dashed lines 43 and 44. Within this mass, the heavier particles are selectively forced to the periphery defined by the inner wall 25. Because of the differential motion of the parts 21 and 26, helical conveyor 21a operates to move these heavier particles to the left of the construction shown in Fig. 2, with the result that they are discharged centrifugally through ports 45 and 46. These ports discharge into space 47 defined by stationary housing 48 and the inwardly projecting rib or partition 49 from which they fall downwardly into chute 51. Simultaneously, the remainder of the residue flows to the right of the construction shown in Fig. 2 through the spaces between the respective sections of scraper 21a. As more residue is continuously introduced through pipe 18, there is a progressive continuous addition to the liquid in the mass with the result that liquid flows continuously through overflow ports 52 and 53 into space 54 defined by the right hand end of housing 48 and the inwardly projecting rib or baffle 55, from which the liquid runs down through duct 56 into pipe 63 by which it is conducted away.

In the practical operation of the centrifuge for any particular rate of introduction of the slops through pipe 18, the speed of rotation of the member 26 is adjusted to throw out centrifugally only a part of the total suspended matter in the slops or residue corresponding by weight to not over 160%, and preferably from 80 to 160% of the actual weight of the solid potassium acid tartrate present in the slops. Generally speaking, the speed of rotation of the member 26 is adjusted to throw out centrifugally suspended matter equivalent by weight to from 80 to 120% by weight of the solid potassium acid tartrate present in the slops.

The desired adjustment may be easily arrived at by progressively increasing the speed of rotation of the member 26, or alternatively, by progressively decreasing the amount of slops introduced, until the amount of material centrifugally separated is within a specified range. Within this range, it will be found that the action of the centrifuge is selective and that the material centrifugally separated and discharged through ports 45 and 46 will consist predominantly of potassium acid tartrate. The greater part of the organic constituents remain suspended, and, therefore, pass off predominantly through the overflow ports 52 and 53 with the liquid content of the residue. I have found it possible in this way to recover between 80 and 85% of the total potassium acid tartrate present in the residue of a purity (dry basis) exceeding 80%.

Referring again to Fig. 1, the crude, moist material consisting predominantly of potassium acid tartrate is conducted by chute 60 into dryer 61 in which it is dried and is thereafter conducted by conveyor 62 to storage or shipment. It may, of course, be reprocessed to be converted into relatively more pure forms of potassium acid tartrate.

The liquid in the residue together with the bulk of the suspended organic material discharged from duct 56 is conducted through pipe 63 into the bite 64 of the heated drying rolls 65 and 66, which revolve in the directions indicated by the arrows thereon. The dried material is removed from the drying rolls by doctor blades 67 and 68 and moved thence by the worm conveyor 69 and by the elevator 70 by which it is discharged into the bin 71. From this bin, the dried material may be discharged into cars or sacked for shipment. It constitutes a valuable animal food.

The foregoing description is for purposes of illustration and not of limitation and it is, therefore, my intention that the invention be limited only by the following claims, wherein I have endeavored to claim broadly all inherent novelty.

I claim:

1. Process of recovering potassium acid tartrate from winery residues containing potassium acid tartrate in substantially aqueous solution and substantially undissolved organic matter which comprises subjecting such a residue, having a potassium acid tartrate concentration substantially saturate at a temperature of at least about 200° F., to agitation while cooling the same at a rate of at least 5° F. per hour through the range in which said potassium acid tartrate substantially separates from such saturate solution, to thereby obtain an aqueous mix containing suspended organic matter and centrifugally therefrom separable potassium acid tartrate, thereafter substantially continuously subjecting said mix to substantially selective centrifugal separation at a rate of input and centrifugal rotation coordinated to obtain separation of suspended solids equivalent to not exceeding about 16% of the dry weight of the tartrate present in said residue.

2. Process according to claim 1 in which said residue is cooled at a rate of at least 10% F. per hour.

3. Process according to claim 2 in which the cooled residue is subjected to said centrifugal separation at a rate of input and centrifugal rotation coordinated to obtain tartrate separation equivalent to not exceeding about 80 to 120% by dry weight of tartrate present in said residue.

4. Process according to claim 3 in which said residue is subjected to agitation while cooling the same from at least 200° F. to about 70 to 100° F.

ELLIS C. PATTEE.

REFERENCES CITED

The following references are of record in the file of this patent:

UNITED STATES PATENTS

| Number | Name | Date |
| --- | --- | --- |
| 1,383,313 | Landreth | July 5, 1921 |
| 994,497 | Berrigan | June 6, 1911 |

FOREIGN PATENTS

| Number | Country | Date |
| --- | --- | --- |
| 7,363 | British | 1903 |

OTHER REFERENCES

Ayres, "Separation by Centrifugal Force," Sharples Corp., Dec. 8, 1942, pp. 1 and 4.

Perry, "Chem. Eng. Handbook," 2d ed., McGraw-Hill Book Co., p. 1849.

Thorpe, "Dict. of Applied Chem.," Longmans & Co., vol. 6 (1926), pp. 688, 694.

Gatterman, "Pract. Methods of Org. Chem." (1923), p. 8.

Boussu, Chemical Abstracts, vol. 18 (1924), p. 6.

Certificate of Correction

Patent No. 2,433,864.  January 6, 1948.

ELLIS C. PATTEE

It is hereby certified that error appears in the printed specification of the above numbered patent requiring correction as follows: Column 5, line 15, for "10% F." read *10° F.*; and that the said Letters Patent should be read with this correction therein that the same may conform to the record of the case in the Patent Office.

Signed and sealed this 16th day of March, A. D. 1948.

[SEAL]

THOMAS F. MURPHY,
*Assistant Commissioner of Patents.*